United States Patent [19]

Coassolo et al.

[11] Patent Number: 4,985,533

[45] Date of Patent: Jan. 15, 1991

[54] TERMOTROPIC LIQUID-CRYSTALLINE AROMATIC POLYESTER FROM HYDROQUINONE/SUBSTITUTED HYDROQUINONE MIXTURE

[75] Inventors: Alfredo Coassolo; L. Lawrence Chapoy; Marco Foà, all of Novara; Giampiero Sabarino, Vercelli, all of Italy

[73] Assignee: Montedison S.p.A., Milan, Italy

[21] Appl. No.: 358,512

[22] Filed: May 30, 1989

Related U.S. Application Data

[63] Continuation of Ser. No. 254,187, Oct. 6, 1988, abandoned.

[30] Foreign Application Priority Data

Oct. 9, 1987 [IT] Italy .................... 22198A/87

[51] Int. Cl.$^5$ .............................................. C08G 63/02
[52] U.S. Cl. .................................. 528/193; 528/176; 528/194; 524/601

[58] Field of Search ..................... 528/176, 193, 194

[56] References Cited

U.S. PATENT DOCUMENTS

| | | | |
|---|---|---|---|
| 4,600,765 | 7/1986 | Lee et al. | 528/193 |
| 4,614,791 | 9/1986 | Hutchings et al. | 528/193 |
| 4,668,760 | 5/1987 | Boudreaux, Jr. et al. | 528/193 |

*Primary Examiner*—Harold D. Anderson
*Assistant Examiner*—T. Mosley
*Attorney, Agent, or Firm*—Stevens, Davis, Miller & Mosher

[57] ABSTRACT

Thermotropic liquid-crystalline aromatic polyesters processable in the molten state, comprising units derived from at least one dicarboxylic aromatic acid and from mono- and di-substituted (1-phenyl-ethyl)-hydroquinones in admixture with hydroquinone, and/or hydroquinones substituted with halogen or alky, aryl or cycloalkyl groups.

18 Claims, No Drawings

TERMOTROPIC LIQUID-CRYSTALLINE AROMATIC POLYESTER FROM HYDROQUINONE/SUBSTITUTED HYDROQUINONE MIXTURE

This application is a continuation of application Ser. No. 254,187, filed Oct. 6, 1988 now abandoned.

DESCRIPTION OF THE INVENTION

The present invention relates to thermotropic liquid-cyrstalline aromatc polyesters.

More particularly, the present invention relates to thermotropic liquid-crystalline aromatic polyesters easily processable in the molten state, and having the mesogen group in the main chain.

Thermotropic polyesters showing optical anisotropy in the molten state are products known and described in several examples in the technical literature, such as British Polymer Journal (December 1980), "Liquid Crystal Polymer IV - Liquid Crystalline Aromatic Polyesters", Die Augewandte Makromolekulare Chemie (1982), 109–120, "Rigid Chain Polymers" pages 1–19; Die Augewandte Makromolekulare Chemie, "Thermotropic Liquid Crystalline Polymers" 145/146 (1986) pages 231–257; Journal of Molecular Science Review (1986) C26(4) 1986, pages 551–650.

The use of such polyesters makes it possible to obtain high-tenacity fibers from the molten polymer, or for articles to be molded, e.g., injection-molded, which show suitable characteristics of rigidity, hardness and toughness.

The polymers endowed with the above properties are generally easy to process in the molten state, show a high resistance to heat and oxidation, and furthermore, owing to their crystallinity, have high Heat Distorsion Temperature (HDT) values, and a high resistance to solvents.

The polymers which can be obtained by means of the polycondensation of terephthalic acid and hydroquinone (poly-1,4-phenylene-terephthalate) melt at too high temperatures (higher than 600° C.) to enable them to be processed without decomposition. A route used in order to decrease the melting point consists in using substituents on the aromatic ring of the hydroquinone or of the terephthalic acid, or in modifying the polymer by means of the addition of other co-monomers.

U.S. Pat. No. 4,600,765 discloses the preparation of thermotropic liquid-crystalline polyesters by polycondensation of terephthalic acid with (1-phenyl-ethyl)hydroquinone and other substituted hydroquinones, such as, e.g., phenyl-hydroquinone, in order to obtain liquid-crystalline polymers having a melting point within the range of from 300° to 350° C.

According to what is disclosed in that patent (1-phenyl-ethyl)-hydroquinone is obtained, at a temperature of approximately 140° C., by means of the reaction of hydroquinone and styrene in a solvent medium, and in the presence of a catalyst constituted by para-toluenesulphonic acid monohydrate. The thus-obtained raw reaction product, after neutralization of the catalyst with sodium bisulphite, is subjected to a series of distillations in order to carefully remove any di-substituted products.

Even if not explicitly stated, anyone skilled in the art will no doubt understand that these operations of distillation have been provided for, in the belief that the di-substituted derivatives might lead, owing to steric hindrance, to the destruction of the liquid-crystalline charactristics of the end polymer.

It has now been discovered (in accordance with the present invention) that mixtures containing substantial amounts of di-(phenyl-ethyl)-hydroquinone, together with the corresponding mono-substituted derivative, may be used for preparing thermotropic liquid-crystalline, aromatic polyesters.

Therefore, the object of the present invention is the provision of thermotropic liquid-crystalline aromatic polyesters comprising:

(a) at least one unit derived from a dicarboxylic aromatic acid;

(b) units derived from a mixture comprising (1-phenyl-ethyl)-hydroquinones and di-(phenyl-ethyl)hydroquinone; and (c) at least one unit derived from hydroquinones having the formula:

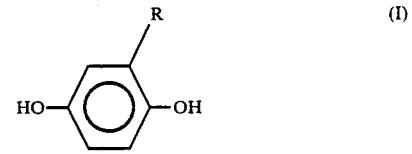

(I)

wherein

R represents hydrogen, a halogen atom, or an alkyl radical containing from 1 to 6 carbon atoms, or a cycloalkyl or a single-ring, double-ring or fused ring possibly substituted, aryl radical containing from 6 to 15 carbon atoms.

According to a preferred form of a practical embodiment of the polyesters of the present invention, at least 90 mol % of the dicarboxylic aromatic acid are present in the "para" isomeric form.

Examples of suitable dicarboxylic aromatic acids are terephthalic acid, optionally substituted with at least one halogen, such as chlotine or bromine, methylterephthalic acid, 1,4-naphthalene-dicarboxylic acid, 1,5-naphthalene-dicarboxylic acid, and 2,6-naphthalene-dicarboxylic acid, 4,4'-diphenyl-dicarboxylic acid, 3,3'-dibromo-4,4'-diphenyl-dicarboxylic acid, and so forth.

The di-(phenyl-ethyl)hydroquinone is generally 2,5-di(phenyl-ethyl)hydroquinone, and is contained in admixture with the corresponding non-substituted hydroquinone in molar amounts within the range of from 5 to 50%, and preferably of from 10 to 40%.

Examples of hydroquinones of formula (1) are hydroquinone, chloro- or bromo-hydroquinone, methylhydroquinone, ethyl-hydroquinone, propyl-hydroquinone, tert.-butyl-hydroquinone, cyclohexyl-hydroquinone, phenyl-hydroquinone, and so forth.

The thermotropic liquid-cyrstalline aromatic polyesters of the present invention comprise units derived from dicarboxylic aromatic acids in a stoichiometric ratio with respect to the units derived from the diols of items (b) and (c), whilst these latter are used with molar ratios of (b)/(c) within the range of from 0.25 to 4, and preferably of from 0.8 to 2, and still more preferably with a molar ratio of 1 to 1.

Particularly preferred thermotropic liquid-crystalline aromatic polyesters are those which contain the following repeated units:

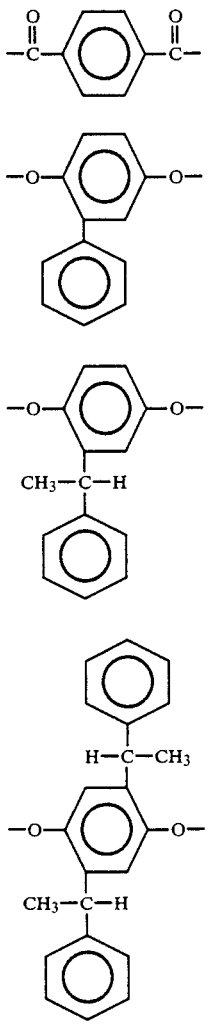

wherein the molar ratio of (IV+V,)/(III) is within the range of from 0.25 to 4, preferably of from 0.8 to 2, an still more preferably is equal to 1 to 1, and the (V)/(IV) molar ratio is within the range of from 0.05 to 1, preferably of from 0.1 to 0.7.

The polyesters of the present invention are optically anisotropic in the molten state, as may be verified by analysis by optical microscopy under polarized light, and have an inherent viscosity, as measured in a 1:1 mixture of trifluoroacetic acid and methylene chloride at 30° C. at a concentration of 2.5 g/liter, within the range of from 0.3 to 4 dl/g.

The melting temperature may vary over very wide ranges, according to the composition of the polyesters, and of the degree of polymerization; such a temperature is generally within the range of from 250° to 350° C.

The molecular weight and the crystallinity may be increased by heating the polyester particles in an inert environment or under vacuum, at a temperature just under the melting point, for a time varying within the range of from 1 to 20 hours.

The polyesters according to the present invention are suitable for obtaining manufactured articles by means of conventional technologies for thermoplastic polymer fabrication, such as, e.g., injection molding or extrusion; they may be transformed into film or fiber shape; they may be used as matrices for composite materials based on fibers or inorganic fillers; and they may be used for preparing blends with other polymers.

The preparation of the thermotropic liquid-crystalline aromatic polyesters of the present invention may be carried out according to conventional techniques, by making the above-mentioned units react under the normal conditions for the preparation of polyester resins.

The compounds as mentioned under items (a) and (c) are known products available on the market, whilst the compounds listed under (b) may be obtained by means of the usual techniques of alkylation, such as those disclosed in U.S. Pat. No. 2,247,404, or in U.S. Pat. No. 2,714,120.

Preferred precursors for the unit (II) are the acids, the esters or the corresponding di-halides, such as the chlorides or bromides; preferred precursors for the units (III), (IV) and (V) are the diols, or the corresponding acetates or propionates obtained by the usual techniques of esterification.

The thermotropic liquid-crystalline aromatic polyesters of the present invention may be obtained in the molten state, or in the presence of a high-boiling dispersing medium, such as diphenyl-sulphone, or mixtures of partially hydrogenated terphenyls, by transesterification between the dicarboxylic aromatic acids and the acetates or propionates of the aromatic diols at temperatures within the range of from 270° to 370° C., so as to favor the complete release of the acids, as well as by operating under vacuum.

The reaction may optionally be carried out in the presence of a transesterification catalyst, such as, e.g., alkali-metal or alkaline-earth-metal phosphates.

Further catalysts may be those commonly used in polycondensation processes, and set out in "Encyclopaedia of Polymer Science and Technology" (1969), Vol. 10, pages 722-723.

Examples of such catalysts are the oxides, hydroxides, hydrides, halides, alcoholates or phenolates, the salts and the complex salts of organic or inorganic acids of lithium, sodium, potassium, magnesium, calcium, titanium, manganese, cobalt, zinc, tin, antimony, lanthanum, cerium, lead, and germanium.

The amount of catalyst required is within the range of from 0.005 to 1% by mol, and preferably of from 0.01 to 0.2%, based on the total amount of the reactants.

According to an alternative method, the thermotropic liquid-crystalline polyesters of the present invention may be obtained in solution, by polycondensation between the halides of the dicarboxylic aromatic acids and the mixture of the aromatic diols in a suitable solvent. The temperature is within the range of from 25° to 220° C. and the reaction is carried out in the presence of a base and/or of a stream of nitrogen in order to favor the removal of the hydrogen halide.

Among the bases, pyridine is preferred, whilst among the solvents, particularly preferred are both aliphatic and aromatic chlorinated solvents, such as methylene chloride, chloro-benzene, dichloro-benzenes and trichloro-benzenes.

The so-obtained polymer is subsequently recovered by evaporating the solvent, or by precipitation with a non-solvent, and subsequent filtration.

In order still better to understand the present invention and to practice it, here follow some illustrative, non-limitative examples thereof.

EXAMPLE 1

To a 4-neck glass flask of 100 cc capacity, fitted with mechnical stirrer, condenser, and nitrogen inlet, 3.65 g (18 mM) of terephthalic acid chloride, 1.67 g (9 mM) of phenyl-hydroquinone, 1.50 g (7 mM) of (1-phenyl-ethyl)hydroquinone, 0.64 g (2 mM) of 2,5 di-(phenyl-ethyl)hydroquinone, and 65 cc of 1,2,4"trichloro-benzene are charged under a slight nitrogen stream.

The reaction mixture is kept stirred under a slow nitrogen stream over 30 minutes at room temperature; then heating is started, and the temperature is increased to 220° C.

The reaction mixture is maintained at this temperature for 8 hours, until the development of HCl ceases. At the end of the polymerization, the reaction solution has the appearance of a mass of jelly.

With the nitrogen flow and stirring being still continued, the heating is discontinued, and the reaction mass is allowed to cool down.

When the reaction mixture has reached a temperature of 50° C., the mass of jelly is poured into acetone, and the precipitate is filtered off.

The so-obtained polymer is washed with acetone (twice), warm water (twice), and acetone/methanol (twice).

The end product is dried under vacuum for 3 hours at 80° C.

The dry polymer has a melting temperature (Tm) of 318° C., a crystallization temperature (Tc) of 260° C., and an inherent viscosity of 1,60 dl/g (as measured at a temperature of 30° C., at a concentration of 2.5 g/liter in a solvent composed of equal volumes of trifluoroacetic acid and methylene chloride).

The molten polymer is optically anisotropic under the polarized-light microscope.

The polymer was subsequently annealed at 290° C. for 2½ hours under a nitrogen stream. The crystallinity reached 17% by volume, while the melting temperature (Tm) remained constant (318° C.).

EXAMPLES 2-4

Other polyesters were prepared according to the same procedure as described in Example 1.

The amounts of the reactants and the characteristics of the polyesters are reported in the following Table.

These polyesters are all optically anisotropic in the molten state under the polarized-light microscope.

| Ex-ample | mol (a) | (b) | (c) | (d) | Inherent Viscosity (dl/g) | Melting Temperature (Tm °C.) | Crystallinity Temperature (Tc °C.) |
|---|---|---|---|---|---|---|---|
| 2 | 1 | 0.5 | 0.47 | 0.03 | 1.62 | 337 | 295 |
| 3 | 1 | 0.5 | 0.432 | 0.068 | 1.35 | 328 | 285 |
| 4 | 1 | 0.5 | 0.35 | 0.15 | 1.24 | 306 | 244 |

(a) = Terephthalic acid chloride
(b) = Phenyl-hydroquinone
(c) = (1-phenyl-ethyl)-hydroquinone
(d) = 2,5-di(phenyl-ethyl)hydroquinone.

The melting temperatures and the crystallinity temperatures are determined by D.S.C. (Differential Scanning Calorimetry), with a scanning rate of 20° C. per minute for the melting temperature, and a scanning rate of 10° C. per minute for the crystallinity temperature.

What is claimed is:

1. Thermotropic liquid-crystalline aromatic polyester comprising:
   (a) at least one unit derived from a dicarboxylic aromatic acid;
   (b) units derived from a mixture comprising (1-phenyl-ethyl)-hydroquinone and di(phenyl-ethyl)-hydroquinone; and
   (c) at least one unit derived from a hydroquinone having the general formula:

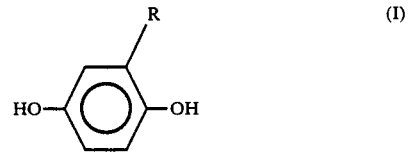

wherein
(R represents a hydrogen or a halogen atom, or an alkyl radical containing from 1 to 6 carbon atoms, or a cycloalkyl, single-ring, double-ring or fused ring, optionally substituted, aryl radical containing from 6 to 15 carbon atoms.

2. Polyester according to claim 1, wherein at least 90 mol % of the dicarboxylic aromatic acid a is present in the "para" isomeric form.

3. Polyester according to claim 2, wherein the dicarboxylic aromatic acid is terephthalic acid, optionally substituted with at least one halogen atom, methyl-terephthalic acid, 1,4-naphthalene-dicarboxylic acid, 1,5-naphthalene-dicarboxylic acid, 2,6-naphthalene-dicarboxylic acid, 4,4'-diphenyl-dicarboxylic acid, or 3,3'-dibromo-4,4'-diphenyl-dicarboxylic acid.

4. Polyester according to claim 1 or 2, wherein the hydroquinone is hydroquinone, chloro- or bromo-hydroquinone, methyl-hydroquinone, ethyl-hydroquinone, Propyl-hydroquinone, tert.-butyl-hydroquinone, cyclohexyl-hydroquinone, or phenyl-hydroquinone.

5. Polyester according to claim 1 or 2, wherein the di-(phenyl-ethyl)hydroquinone 2,5-di(phenyl-ethyl)-hydrquinone.

6. Polyester according to claim 1 or 2, wherein the di(phenyl-ethyl)hydroquinone is contained in admixture with the corresponding mono-substituted hydroquinone in molar amounts within the range of from 5 to 50%, by weight.

7. Polyester according to claim 1 or 2, wherein the units derived from the dicarboxylic aromatic acid are in stoichiometric ratio with respect to the units derived from the diols of items (b) and (c), whilst these latter are used in molar ratios of (b)/(c) within the range of from 0.25 to 4.

8. Polyester according to claim 7, wherein the molar ratio of (b)/(c) is 1 to 1.

9. Polyester according to claim 1 or 2, containing the following repeated units:

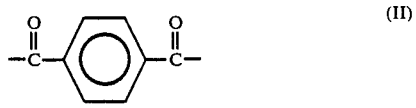

-continued

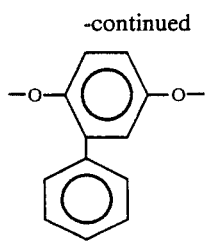
(III)

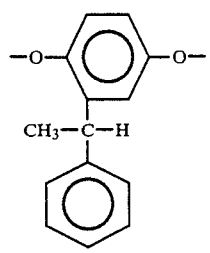
(IV)

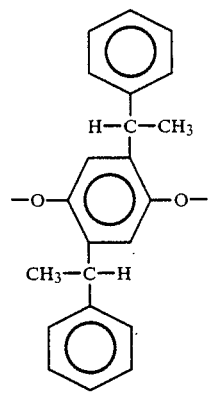
(V)

wherein the molar ratio of (IV+V)/(III) is within the range of from 0.25 to 4, and the (V)/(IV) ratio is within the range of from 0.05 to 1.

10. Polyester according to claim 9, wherein the molar ratio of (IV+V)/(III) is 1 to 1.

11. Polyester according to claim 1 or 2, having an inherent viscosity, as measured in a 1:1 mixture of trifluoroacetic acid and methylene chloride at 30° C. at a concentration of 2.5 g/liter, comprised within the range of from 0.3 to 4 dl/liter.

12. A fibre, film, or article manufactured from the polyester of claim 1.

13. A molded article formed of the polyester of claim 1.

14. An extruded article formed of the polyester of claim 1.

15. A composite material constituted of a matrix manufactured from the polyester of claim 1, said composite comprising fibres, inorganic fillers, or organic polymers different from the polyester of claim 1.

16. Polyester according to claim 1 or 2, wherein di(phenyl-ethyl)hydroquinone is contained in admixture with the corresponding mono-substituted hydroquinone in molar amounts within the range of from 10 to 40%, by weight.

17. Polyester according to claim 1 or 2, wherein the units derived from the dicarboxylic aromatic acid are in stoichometric ratio with respect to the units derived from the diols of items (b) and (c), wherein the molar ratios of (b)/(c) are within the range of 0.8 to 2.

18. Polyester according to claim 1 or 2, containing the following repeated units:

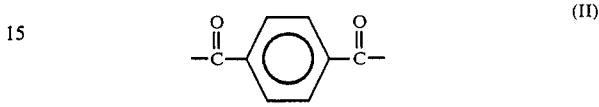
(II)

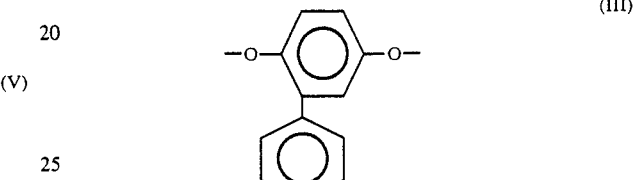
(III)

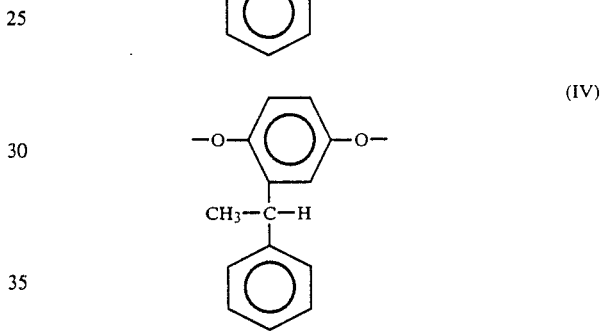
(IV)

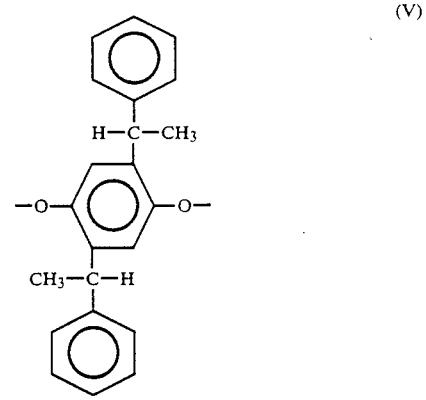
(V)

wherein the molar ratio of (IV+V)/(III) is within the range of from 0.8 to 2, and the (V)/(I/V) molar ratio is within the range of from 0.1 to 0.7.

* * * * *